(12) United States Patent
Yang

(10) Patent No.: US 9,001,994 B1
(45) Date of Patent: Apr. 7, 2015

(54) NON-UNIFORM ADAPTIVE ECHO CANCELLATION

(71) Applicant: Rawles LLC, Wilmington, DE (US)

(72) Inventor: Jun Yang, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 14/035,369

(22) Filed: Sep. 24, 2013

(51) Int. Cl.
*H04M 9/08* (2006.01)
*H04B 3/23* (2006.01)

(52) U.S. Cl.
CPC ........................... *H04B 3/237* (2013.01)

(58) Field of Classification Search
USPC ........................ 379/406.08, 406.14
See application file for complete search history.

(56) References Cited

U.S. PATENT DOCUMENTS

| | | | |
|---|---|---|---|
| 5,548,642 A * | 8/1996 | Diethorn | 379/406.14 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,374,851 B2 * | 2/2013 | Unno et al. | 704/208 |
| 2003/0235294 A1 * | 12/2003 | Dyba et al. | 379/406.01 |
| 2005/0152534 A1 * | 7/2005 | Lipari et al. | 379/406.08 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Alexander Jamal
(74) *Attorney, Agent, or Firm* — Lee & Hayes, PLLC

(57) ABSTRACT

An audio-based system may perform echo cancellation by decomposing an input audio signal and a corresponding reference signal into sub-signals corresponding to different frequency bands and implementing adaptive filtering independently for each frequency band. Computational resources may be allocated differently for each of the frequency bands depending on observed conditions. Orders of adaptive FIR filters may be varied during operation. Double talk detection and echo path change detection may be implemented for some frequency bands and not others. Filter adaption rates may also be assigned independently to each of the FIR filters, and may be changed during operation.

21 Claims, 6 Drawing Sheets

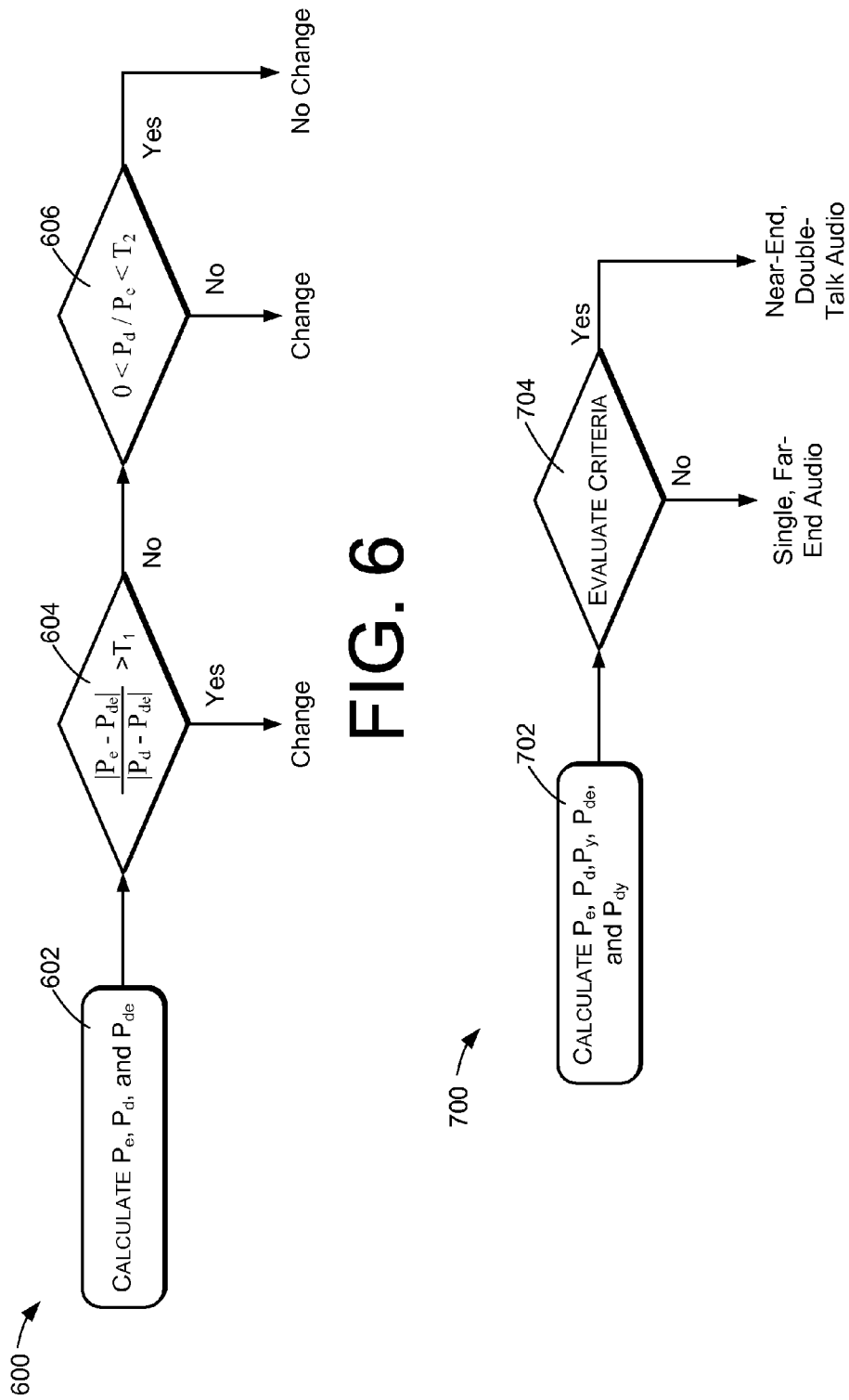

NON-UNIFORM ADAPTIVE ECHO CANCELLATION

BACKGROUND

Acoustic echo cancellation (AEC) is used in telecommunications devices to improve audio quality. In this environment, an echo is a delayed reoccurrence of an original signal in a received or retransmitted signal. Audio echo may be caused by an acoustic echo path between the microphone and speaker of a communications device such as a telephone handset. AEC is particularly useful in so-called "hands-free" communications devices, where there is very little acoustic isolation between the microphone and speaker of the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flowchart illustrating an example method of performing echo path change detection.

FIG. 7 is a flowchart illustrating an example method of performing double talk detection.

DETAILED DESCRIPTION

Described herein are techniques for acoustic echo cancellation with respect to an input signal having echoed components of a reference signal. The input and reference signals are filtered to produce sub-signals corresponding to different frequency bands. The input sub-signals are processed by respective acoustic echo suppression components based on the corresponding reference sub-signals to produce a plurality of echo-suppressed sub-signals. The echo-suppressed sub-signals are then processed to synthesize a full-band echo-suppressed sub-signal.

Echo cancellation is performed within each frequency band by an adaptive filter such as adaptive finite impulse response (FIR) filter. Different computational resources may be allocated to each of the frequency bands depending on characteristics of the signals in the frequency bands. For example, the FIR filters corresponding to different frequency bands may be configured to have different filter orders, with higher filter orders being configured for frequency bands containing higher energies or more significant voice components. As another example, double talk detection and echo path change detection may be implemented in selected frequency bands.

Computational resources may be allocated upon initialization or may be dynamically allocated and reallocated during operation. Dynamic allocations may be based on characteristics of the input and reference sub-signals as well as other signals.

Filter parameters may be calculated and applied by adaptive filters to estimate echo components of the input sub-signals. The filter parameters may be subject to an adaptation rate, which may be calculated dynamically based on estimated energies or power of the various signals.

Different adaptation rates may be used by different instances of the filters. Additionally, the adaptation rate corresponding to particular frequency band may be frozen or otherwise controlled in response to detecting double talk and/or changes in echo paths in the particular frequency band.

Figure 1:
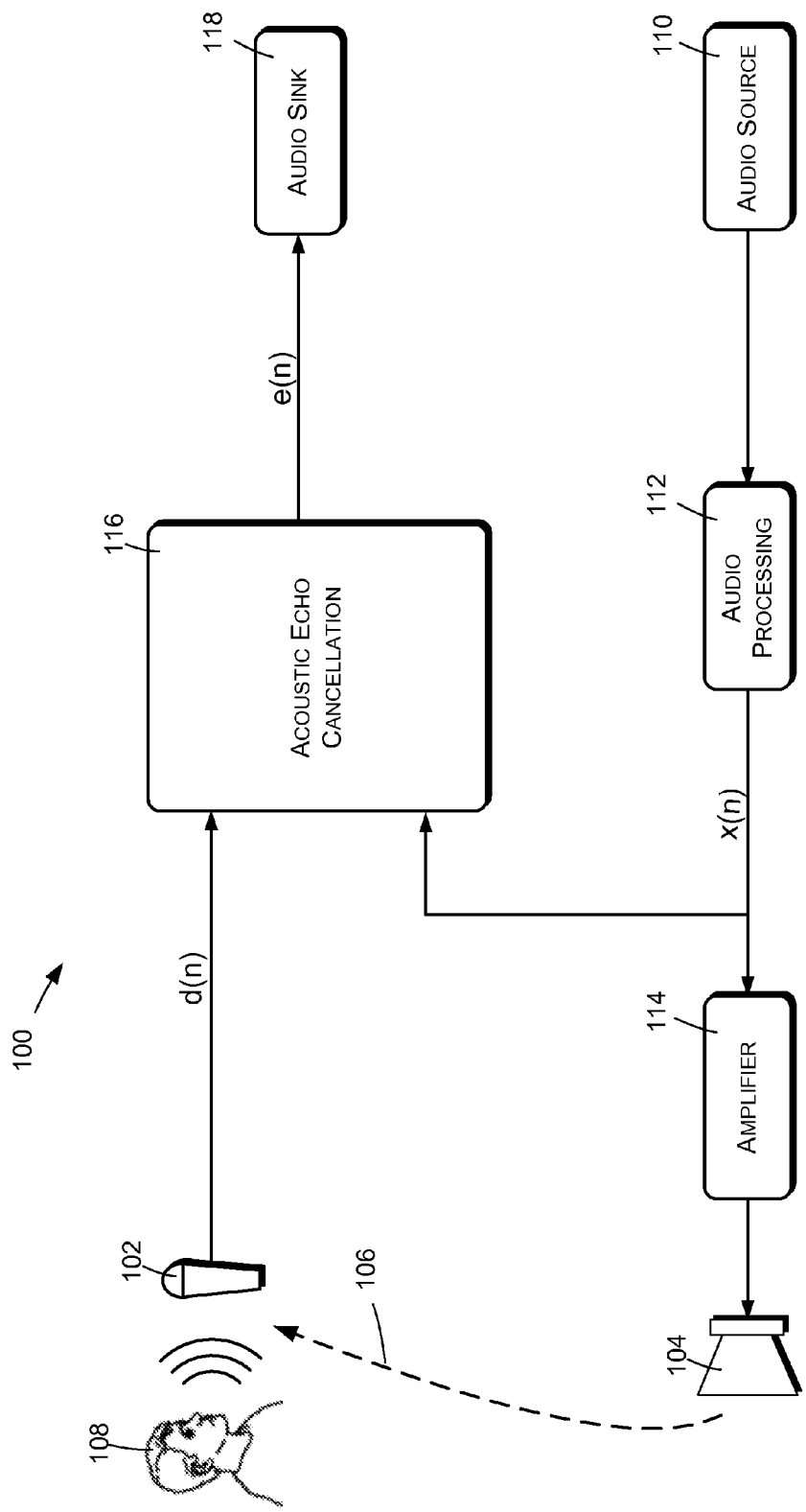
FIG. 1 is a block diagram illustrating a system and method for acoustic echo suppression or cancellation.

FIG. 1 shows an example system 100 having an audio microphone 102 and an audio speaker 104 that are coupled by one or more echo paths 106. The voice of a user 108 is captured by the microphone 102, which provides or generates a transmit-path input audio signal d(n). The speaker 104 produces audio in response to a receive-path output audio signal x(n).

The receive-path output audio signal x(n) may originate from an audio source 110 and may be processed by one or more audio processing components 112. The receive-path output audio signal x(n) may also be amplified and/or converted by an amplifier 114 prior to being used to drive one or more elements of the speaker 104.

The audio produced by the speaker 104 may be picked up by the microphone 102 because of the echo paths 106. The input audio signal d(n) may therefore include one or more components of the receive-path output audio signal x(n), as a result of audio propagation over the echo paths 106. These components of the receive-path output audio signal x(n) are referred to as acoustic echoes or echo components.

The system 100 has an acoustic echo cancellation (AEC) component 116, also referred to as an echo suppression component, whose purpose is to suppress or remove the echo or echo components from the transmit-path input audio signal d(n) and to produce an echo-suppressed audio signal e(n) that is in turn provided to an audio consumer or audio sink 118. The AEC component 116 may be implemented by one or more adaptive filters that are configured to estimate echo components based on the receive-path output audio signal x(n), which is used as and referred to as a reference signal in this environment. The AEC is configured to subtract the estimated echo components from the transmit-path input signal d(n) to produce the echo-suppressed audio signal e(n). Further details of the AEC component 116 will be discussed below.

The audio signals shown and discussed herein are assumed for purposes of discussion to be digital signals, comprising continuous sequences of digital amplitude values. For example, audio received from the microphone 102 may be evaluated in the time domain at a predetermined sampling rate $f_s$ to produce sampled amplitude values d(n), d(n+1), d(n+2), .... The nomenclature "c(n)" indicates the $n^{th}$ value of a sequence c of digital amplitude values.

The system 100 may be used within an audio device or system to suppress or cancel echo components of an input audio signal. As an example, the system 100 may be used within a near-end audio input/output device for a telephone, cellular phone, or other communications device. As another example, the system 100 may be used within an interface device that facilitates speech-based interactions with a computerized system. Such an interface device may receive audio containing spoken user commands and may provide the audio or commands to an automated service or system. The interface device may also produce audio, including generated speech, based on signals or information received from such an automated service or system. In some cases, an interface device such as this may be used for playing content such as music, podcasts, and so forth. In environments such as this, the AEC component 116 is designed to suppress the device-generated audio content from the transmit-path input audio signal d(n).

Figure 2:
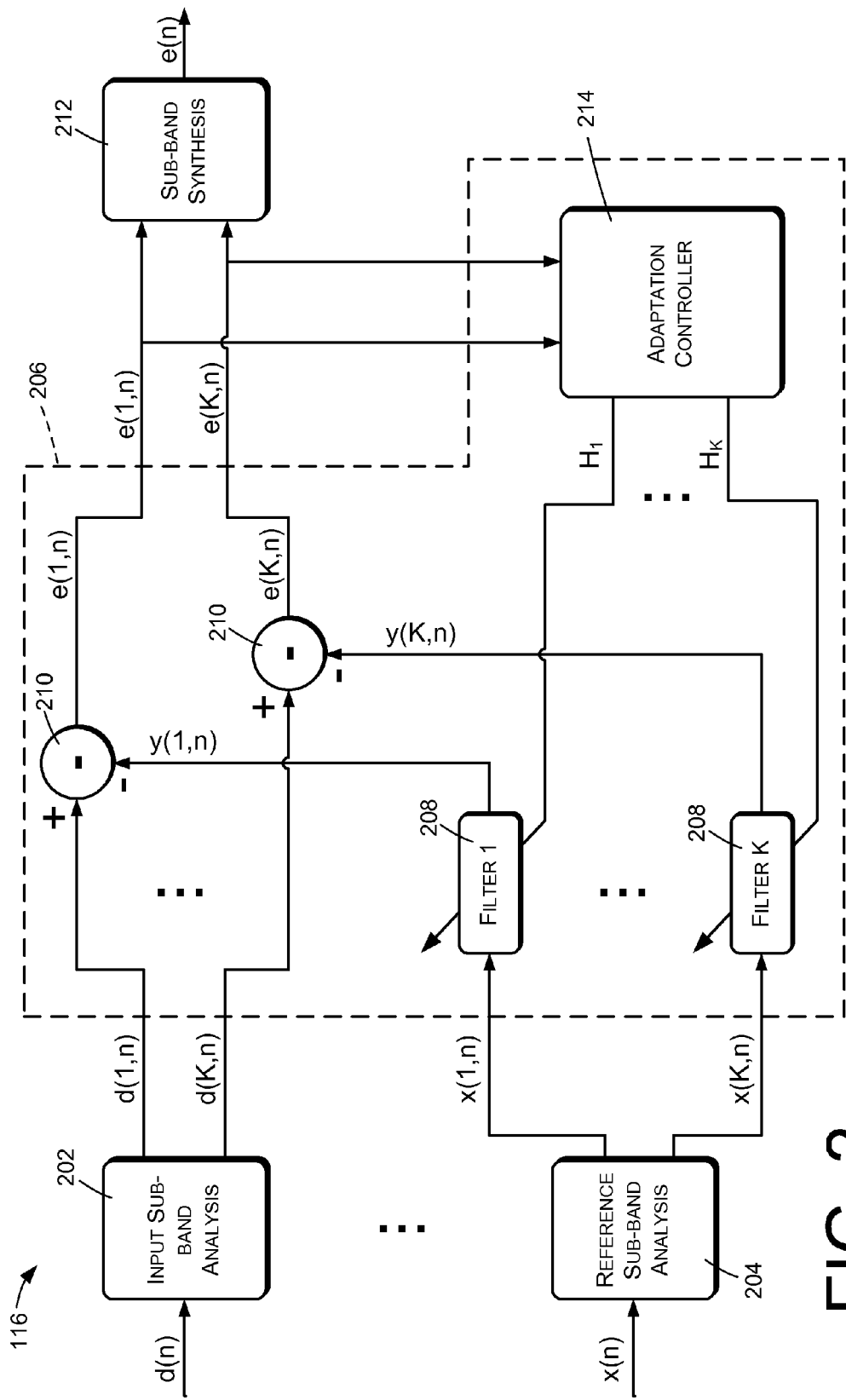
FIG. 2 is a block diagram illustrating an example implementation of non-uniform acoustic echo suppression that may be used in the environment of FIG. 1.

FIG. 2 illustrates an example implementation of the AEC component 116. For purposes of discussion, the transmit-path input audio signal d(n) will be referred to simply as the input signal d(n). The receive-path output audio signal x(n) will be referred to as a reference audio signal x(n).

Generally, the AEC component 116 works by (a) decomposing the input signal d(n) into a plurality of input sub-signals corresponding respectively to different frequency bands, (b) decomposing the reference audio signal x(n) into a plurality of reference sub-signals corresponding respectively to the different frequency bands, (c) adaptively filtering each input sub-signal based on the reference sub-signal of the same band to produce echo-suppressed input sub-signals corresponding respectively to the different frequency bands, and (d) synthesizing the echo-suppressed audio signal e(n) by combining the echo-suppressed input sub-signals. In the illustrated example, it is assumed that d(n), x(n), and e(n) are of sampling rate fs, and that d(i,n), x(i,n), y(i,n), and e(i,n) are of sampling rate fs/R, where R is a sub-sampling factor.

The AEC component 116 comprises an input sub-band analysis component 202 that receives the input signal d(n) and produces multiple input sub-signals d(1,n) through d(K, n) corresponding respectively to each of multiple frequency bands, where K is the number of frequency bands. The input sub-band analysis component 202 may be implemented as either an FIR filter bank or an infinite impulse response (IIR) filter bank, with downsampling in each band by a factor of R, such that each input sub-signal d(i,n) represents audio data or components of a corresponding frequency band i at a relatively lower sampling rate.

The AEC component 116 also comprises a reference sub-band analysis component 204 that receives the reference signal x(n) and produces multiple reference sub-signals x(1,n) through x(K,n) corresponding respectively to each of the K frequency bands. The reference sub-band analysis component 204 is implemented using the same types of filters and down-sampling as the input sub-band analysis component 202, such that each reference sub-signal x(i,n) represents audio components of a corresponding frequency band i at a relatively lower sampling rate.

The sub-band analysis components 202 and 204 may be implemented to subsample the input signal d(n) and the reference signal x(n) by a factor of R, where R is equal to the number K of frequency bands. For example, if the sampling rates of d(n) and x(n) are $f_s$=16 kHz and there are eight frequency bands, the subsampling factor R is equal to 8 and the sampling rate of an individual sub-band filter is 16 kHz/8=2 kHz.

The input sub-signals d(i,n) and the reference sub-signals x(i,n) are received and processed by a processing array 206, which contains an echo canceller or echo cancellation component corresponding to each of the frequency bands. Each echo canceller comprises an adaptive filter 208 and a corresponding subtraction component 210. The adaptive filter 208 corresponding to the $i^{th}$ frequency band receives the input sub-signal d(i,n) and reference sub-signal x(i,n) of the $i^{th}$ frequency band and produces an estimated echo sub-signal y(i,n) that contains the estimated echo components of the $i^{th}$ frequency band. The subtraction components 210 subtract the estimated echo components y(i,n) from the input sub-signals d(i,n) of the corresponding frequency bands to produce echo-suppressed input sub-signals e(i,n) corresponding respectively to the frequency bands. The echo-suppressed input sub-signals e(i,n) are also referred to as error sub-signals e(i,n) in this environment. The error sub-signals e(i,n) are used by the adaptive filters 208 to dynamically estimate filter parameters, as will be described in more detail below.

The AEC component 116 also comprises an signal synthesizer component 212 that is configured to synthesize the echo-suppressed output audio signal e(n) from the echo-suppressed input sub-signals e(i,n) corresponding to the different frequency bands. The signal synthesizer 212 may be implemented to up-sample by a factor of R using a synthesis filter bank that is configured to accurately reconstruct the input signal. The signal synthesizer 212 combines or sums the values of the obtained echo-suppressed input sub-signals e'(1, n) through e'(K,n) to produce the echo-suppressed output audio signal e(n), where e'(1,n) through e'(K,n) and e(n) are of the original sampling rate fs. The echo-suppressed output audio signal e(n) represents the results of echo cancellation across all frequency bands. In particular, e(n) comprises the full-band transmit-path input signal d(n) after subtracting or suppressing estimated echo components.

The adaptive filters 208 may be implemented using finite impulse response (FIR) filters, each having variable coefficients $h_1$ through $h_L$ that are calculated and/or controlled by an adaptation controller 214. The adaptation controller 214 provides K sets of coefficients, referred to as coefficients $H_1$ through HK, corresponding respectively to each of the K adaptive filters 208. The coefficients for each filter 208 are calculated independently for the corresponding frequency bands based on the reference sub-signal x(i,n) and error sub-signal e(i,n) corresponding to the filter 208, as well as other information and/or parameters as will be described in more detail below.

Figure 3:
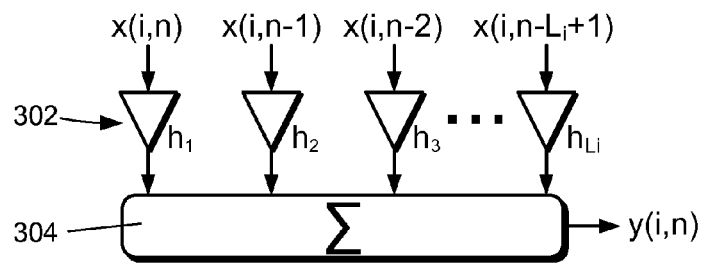
FIG. 3 is a block diagram illustrating an example of a finite impulse response filter that may be used in the implementation shown by FIG. 2.

FIG. 3 shows an example of an FIR filter 208 corresponding to a single frequency band i. The FIR filter 208 receives an input signal comprising a sequence of sampled input values x(i,n) through x(i,n–$L_i$+1). A succession of multipliers 302 are used to multiply the input values by respective coefficients or weights $h_1$ through $h_{ji}$, which are referred to in matrix form as coefficients $H_i$. The resulting products are summed by a summing function 304 to form the output signal y(i,n), which corresponds in time sequence to the value x(i,n).

The multipliers 302 of the FIR filter 208 are referred to as taps, and the number of taps defines the order of the filter 208. The filter 208 of FIG. 3 has $L_i$ taps and therefore has an order equal to ($L_i$–1). In some embodiments, all of the adaptive filters 208 may be of the same order. For example, the filters might each be configured to have a tap length of $L_i$=L/R, where L is the filter tap length that would otherwise be used when implementing a full-band adaptive filter and R is the sub-sampling factor.

In other embodiments, the orders of the filters 208 corresponding to different frequency bands may differ from each other, and some of the filters 208 may have orders that are higher or lower than others of the filters 208. More particularly, the orders of the filters 208 may vary as a function of the frequencies of the corresponding frequency bands. For example, filters associated with low frequency bands, which generally exhibit higher energies than high frequency bands, might be configured to have relatively higher filter orders than filters associated with higher frequency bands.

The filters 208 may also be configured to have different orders or tap lengths $L_i$ in order to account for different echo paths exhibited by or associated with the different frequency bands. In particular, the lengths of the echo paths may vary between frequency bands and may change during operation. The filter orders may be configured as a function of expected or evaluated echo path lengths.

In a specific example, the filter order tap length $L_i$ of an adaptive filter 208 corresponding to frequency band i may be calculated as follows. Let $f_s$ be the sampling rate of the full-band signals d(n) and x(n). Let R be the subsampling rate of the sub-band analysis components 202 and 204. As an example, $f_s$ may equal 16 kHz and R may equal 8. Each sub-band signal therefore corresponds to a sampling frequency of $f_s/R=2$ kHz. Let $L_e$ be the length of an echo path in terms of the number of samples at the sampling rate $f_s$. The tap length $L_i$ of the $i^{th}$ adaptive filter 208, corresponding to frequency band i, may be calculated in accordance with Equation (1), below, based at least in part on the evaluated or expected length $L_e$ of the echo path and the estimated, smoothed, and/or averaged powers of the reference signal x(n):

for $1 \leq i \leq K/2$ $L_i = N$ for $K/2 < i \leq K$ $L_i$=minimum of N and the rounded integer of $[(L_e/R)$
$*P_x(i,n)/Px_{average}]$  Equation (1)

where N is the rounded integer of $L_e/R$, $P_x(i,n)$ is the smoothed power of x(i,n) in the $i^{th}$ frequency band, and $Px_{average}$ is the average power of x(i,n) over all frequency bands. $P_x(i,n)$ and $Px_{average}$ may be calculated as follows:

$P_x(i,n)=(1-\beta) \times P_x(i,n-1)+\beta \times x^2(i,n)$  Equation (2)

$Px_{average}=[P_x(1,n)+P_x(2,n)+ \ldots +P_x(K,n)]/K$  Equation (3)

where $\beta$ is a smoothing factor between 0.0 and 1.0.

The lengths $L_e$ of the echo paths in each of the frequency bands may be determined by experimentation and observation, and the individual tap lengths $L_i$ of the filters 208 may be established when designing the system 100. Alternatively, the tap lengths $L_i$ of the filters 208 may be configured dynamically and updated upon initialization and/or during operation of the system 100 based on dynamically observed echo path lengths. Echo path lengths $L_e$ may be estimated using a method similar to that described above, where x(i,n) is replaced in Equation (2) by y(i,n) to obtain $P_y(i,n)$ and $Py_{average}$, which are used in a manner such as shown in Equation (1) to obtain an estimated tap length.

An FIR filter such as shown by FIG. 3 may be configured to perform adaptively by continuously updating or tuning the filter coefficients $H_i$. In the context of FIG. 2, the coefficients $H_i$ for a particular filter 208 are continuously tuned or optimized to minimize the error sub-signal e(i,n) corresponding to the frequency band i of the filter 208. In the illustrated example, the adaptation controller 214 calculates and/or controls the parameters $H_i$ for each of the adaptive filters 208.

Figure 4:
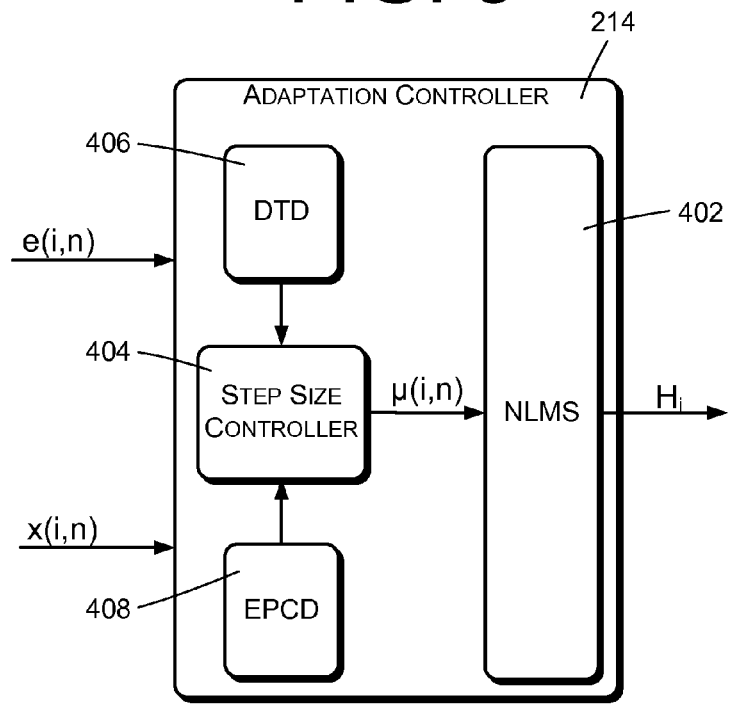
FIG. 4 is a block diagram illustrating an example of an adaptation controller that may be used in the implementation shown by FIG. 2.

FIG. 4 illustrates the functionality of the adaptation controller 214 with respect to a single frequency band i. In actual implementation, the illustrated functionality is duplicated by the adaptation controller 214 independently for each of the K frequency bands, or a separate adaptation controller 214 may be provided for each of the frequency bands.

The adaptation controller 214 comprises a normalized least means squared (NLMS) algorithm or function 402 that calculates the filter parameters $H_i$ based on previous filter parameters, the error sub-signal e(i,n), and the reference sub-signal x(i,n) as shown by Equation (4) below:

$H(i,n)=H(i,n-1)+\mu e(i,n)X(i,n)/\|X(i,n)\|^2$  Equation (4)

where:
$X(i, n)=[x(i,n), x(i,n-1), \ldots, x(i,n-L_i+1)]^T$
$H(i, n)=[h(i,n), h(i,n-1), \ldots, h(i,n-L_i+1)]^T$
$L_i$ is the tap length of the $i^{th}$ sub-band adaptive filter
$\mu$ is an adaptation rate parameter that is also referred to as a step size
the superscript T indicates matrix transformation.

The parameter $\|X(i,n)\|^2$ is equal to $X^T(i,n)X(i,n)$ and can be approximated as an estimated power of the reference signal x(i,n), i.e., $P_x(i,n)$, which may be calculated as shown by Equation (5) below:

$P_x(i,n)=(1-\beta) \times P_x(i,n-1)+\beta \times x^2(i,n)$  Equation (5)

where $\beta$ is a smoothing factor between 0.0 and 1.0. Note that Equation (5) is the same as Equation (2).

The adaptation rate $\mu$ serves to limit or control the amount of change in the filter coefficients over any single iteration of Equation (4). The adaptation rate $\mu$ may be a constant in the range between 0.0 and 1.0. Alternatively the adaptation rate $\mu$ may be dynamically and independently varied by a step size controller 404 of the adaptation controller 214 for each of the frequency bands, based on values of the echo-suppressed sub-signal e(i,n) and the reference sub-signal x(i,n). More specifically, let $\mu(i,n)$ represent an adaptation rate corresponding to d(i,n). The adaptation rate $\mu(i,n)$ corresponding to frequency band i and input sample n may be based on power estimations of the echo-suppressed sub-signal e(i,n), the input sub-signal d(i,n), the reference sub-signal x(i,n), and/or the near-end audio v(i,n) that is present in the input sub-signal d(i,n). An example calculation for the adaptation $\mu(i,n)$ is given by Equation (6) below:

$\mu(i,n)=\max\{1-\alpha P_v(i,n)/P_e(i,n),\xi\}$  Equation (6)

where
$\alpha$ is a positive scalar that is close in value to 1.0 (such as 0.999)
$\xi$ is a positive scalar that is close in value to 0.0 (such as 0.0001)
$P_e(i,n)$ is a power estimation of e(i,n)
$P_v(i,n)$ is a power estimation of v(i,n).
$P_e(i,n)$, the power estimation of e(i,n) may be calculated as shown by Equation (7) below:

$P_e(i,n)=(1-\beta) \times P_e(i,n-1)+\beta \times e^2(i,n)$  Equation (7)

where $\beta$ is a smoothing factor between 0.0 and 1.0.
$P_v(i,n)$, the power estimation of v(i,n) may be calculated as shown by Equation (8) below:

$P_v(i,n)=P_e(i,n)-(P_{xe}(i,n))^2/P_x(i,n)$  Equation (8)

where $P_{xe}(i, n)$ is a cross-power estimation of the error-suppressed sub-signal e(i,n) and the reference sub-signal x(i,n), which may be calculated as shown by Equation 9 below:

$P_{xe}(i,n)=(1-\beta) \times P_{xe}(i,n-1)+\beta \times x(i,n)e(i,n)$  Equation (9)

where $\beta$ is a smoothing factor between 0.0 and 1.0.

The adaptation rate $\mu$ may be variable, and may be recalculated for every input sample of every frequency band.

In certain embodiments, the adaptation rate $\mu$ may be further modified based on whether near-end audio is present in the input sub-signal d(i,n) and/or whether a change is detected in one or more echo paths of the $i^{th}$ frequency band. The adaptation controller 214 may include a double-talk detector (DTD) 406 and an echo path change detector (EPCD) 408 to detect near-end audio and echo path changes based on the error sub-signal e(i,n) and the reference sub-signal x(i,n).

The DTD 406 is configured to detect near-end user voice or double talk in the input audio signal d(i,n). Near-end "talk" refers to audio that is generated in or received from the environment of the microphone 102, and may include the voice of a user. The term "near-end user voice" is used herein to indicate near-end audio representing the voice of a user.

"Far-end audio" refers to sound generated in response to the receive-path output audio signal x(n). In two-way telecommunications environments, far-end audio may comprise the voice of a remote user, which is to be rendered locally by the speaker 104. In other environments, far-end audio may comprise music, speech, or other audio generated by the speaker 104. Far-end audio is often referred to as far-end "talk," particularly in voice communications systems.

"Double talk" refers to a situation in which both far-end audio and near-end user voice are picked up by the microphone 102.

The EPCD 408 is configured to detect changes in the one or more echo paths 106. An echo path change refers to a change in the acoustic response of an echo path to an impulse signal. Echo paths may change when a user moves relative to the microphone 102 or when other objects, including the device that incorporates the microphone 102 and speaker 104, are moved. The EPCD 408 may be configured to indicate whether the echo paths are stable and not changing, or whether one or more echo paths are changing or unstable.

Figure 5:
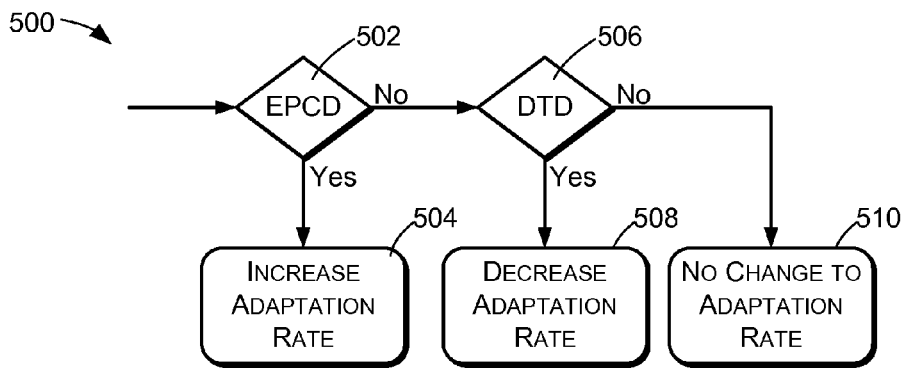
FIG. 5 is a flowchart illustrating an example of controlling a filter adaptation rate based on echo path change detection and double talk detection.

FIG. 5 illustrates an example of a method 500 for modifying or controlling the adaptation rate μ based on detected double-talk and echo path changes. The method of FIG. 5 assumes that the adaptation rate is initially set either as a constant or as a result of Equation (6).

An action 502 comprises detecting changes in the one or more echo paths associated with the frequency band i. If one or more echo path changes are detected, an action 504 is performed comprising increasing the adaptation rate from its previous constant or calculated value. For example, the adaptation rate may be increased by applying a factor of ϒ, where ϒ is greater than 1.0 and less than 1.5. This allows the filter to adapt more quickly to changes in the echo path.

If there is no detected change in echo paths, an action 506 is performed of detecting double talk or near-end user voice in the input audio sub-signal d(i,n). If near-end user voice is present, an action 508 is performed comprising decreasing the adaptation rate from its previous constant or calculated value. Specifically, the adaptation rate may be decreased by a factor or value. For example, the adaptation rate may be decreased by applying a factor of ϒ, where ϒ has a value near 0.0. This slows or freezes the adaptation of the filter and prevents the filter from exhibiting any divergence that may otherwise result from the presence of near-end audio in the input sub-signal d(i,n).

If near-end user voice is not present, an action 510 is performed comprising leaving the adaptation rate at its constant or previously calculated value.

The update control scheme illustrated by FIG. 5 can be alternatively stated as follows:
  If an echo path change is detected, the adaptation rate is increased;
  If the echo paths are stable (i.e., no echo path change is detected), and near-end user voice is detected in the input signal, the adaptation rate is decreased to that the filter parameters H are frozen or limited to very small changes; or
  If echo paths are stable (i.e., no echo path change is detected), and near-end user voice is not detected in the input audio signal, the adaptation rate is left unchanged.

FIG. 6 illustrates an example method 600 that may be performed by the EPCD) 408 to detect a change in an echo path associated with a frequency band i. An action 602 comprises calculating $P_e(i,n)$ and $P_d(i,n)$, the smoothed powers or energies of e(i,n) and d(i,n) in accordance with Equations (10) and (11):

$$P_e(i,n)=(1-\beta)\times P_e(i,n-1)+\beta \times e^2(i,n) \qquad \text{Equation (10)}$$

$$P_d(i,n)=(1-\beta)\times P_d(i,n-1)+\beta \times d^2(i,n) \qquad \text{Equation (11)}$$

where β is a smoothing factor between 0.0 and 1.0.

The action 602 also comprises calculating a smoothed cross-power estimation between the input sub-signal d(i,n) and the error sub-signal e(i,n) in accordance with Equation (12):

$$P_{de}(i,n)=(1-\beta)\times P_{de}(i,n-1)+\beta \times d(i,n)e(i,n) \qquad \text{Equation (12)}$$

where β is a smoothing factor between 0.0 and 1.0.

The actions 604 and 606 comprise determining whether an echo path change has occurred based on $P_e(i,n)$ $P_d(i,n)$ and $P_{de}(i,n)$. An echo path change is identified based on the following evaluations:

$$|P_e(i,n)-P_{de}(i,n)|/|P_d(i,n)-1)-P_{de}(i,n)|>T_1 \qquad \text{Equation (13)}$$

$$0 \geq P_d(i,n)-P_e(i,n) \text{ or } P_d(i,n)-P_e(i,n) \geq T_2 \qquad \text{Equation (14)}$$

where $|P_e(i,n)-P_{de}(i,n)|$ is the absolute value of $P_e(i,n)-P_{de}(i,n)$, $|P_d(i,n)-P_{de}(i,n)|$ is the absolute value of $P_d(i,n)-P_{de}(i,n)$, $T_1$ is a threshold such as 0.01, and $T_2$ is a threshold such as 12 dB. If either of these conditions is satisfied, it is said that there has been an observed or detected change in one or more echo paths. If neither of these conditions is satisfied, it is said that there has not been an observed or detected change in echo paths for the frequency band.

FIG. 7 illustrates an example method 700 that may be performed by the double talk detector (DTD) component 406 to detect double talk in the frequency band i. An action 702 comprises calculating $P_e(i,n)$ and $P_d(i,n)$, the smoothed powers of e(i,n) and d(i,n), in accordance with Equations (10) and (11) above. The action 702 also comprises calculating the smoothed cross-power estimation $P_{de}(i,n)$ between the input sub-signal d(i,n) and the error sub-signal e(i,n) in accordance with Equation (12), above.

The action 702 further comprises calculating a smoothed power estimation of the estimated echo sub-signal y(i,n) in accordance with Equation (15):

$$P_y(i,n)=(1-\beta)\times P_y(i,n-1)+\beta \times y^2(i,n) \qquad \text{Equation (15)}$$

where β is a smoothing factor between 0.0 and 1.0.

The action 702 also comprises calculating a smoothed cross-power estimation between the input audio sub-signal d(i,n) and the estimated echo sub-signal y(i,n) in accordance with Equation (16):

$$P_{dy}(i,n)=(1-\beta)\times P_{dy}(i,n-1)+\beta \times d(i,n)y(i,n) \qquad \text{Equation (16)}$$

An action 704 comprises evaluating various criteria to determine whether near-end user voice is present in the input audio signal. The criteria may be based at least in part on $P_e(i,n)$, $P_d(i,n)$, $P_e(i,n)$, $P_{de}(i,n)$, and $P_{dy}(i,n)$.

Equation (17) indicates an example criterion that may indicate near-end user voice signal in the input sub-signal d(i,n):

$$P_d(i,n)>P_e(i,n)>T_3\times P_d(i,n) \qquad \text{Equation (17)}$$

where $T_3$ is a threshold with $0<T_3<1.0$ such as 0.88.

Equation (18) indicates another example criterion that may indicate the presence of near-end user voice in the input audio sub-signal d(i,n):

$$[P_{dy}(i,n)]^2 < T_4 \times P_d(i,n) \times P_y(i,n)$$ Equation (18)

where $0<T_4<1.0$. Equation (18) expresses a condition in which the cross-correlation coefficient between the input sub-signal d(i,n) and the estimated echo sub-signal y(i,n) is less than a given threshold. The presence of the condition expressed by Equation (18) may be used as an indication of near-end audio in the input audio sub-signal d(i,n).

Equation (19) indicates another example criterion that may indicate the presence of near-end user voice in the input sub-signal d(i,n):

$$[P_{de}(i,n)]^2 > T_5 \times P_d(i,n) \times P_e(i,n)$$ Equation (19)

where $0<T_5<1.0$. Equation (19) expresses a condition in which the cross-correlation coefficient between the input sub-signal d(i,n) and error sub-signal e(i,n) is larger than a given threshold. The presence of the condition expressed by Equation (19) may be used as an indication of near-end audio in the input sub-signal d(i,n).

Any one or more of Equations (17), (18), and (19) may be used in the action 704 as indications of near-end user voice or double-talk. In some cases, one or more of the conditions expressed by Equations (17), (18), and (19) may be used in combination, and near-end user voice may be detected based on a combination of these equations being evaluated as true. For example, near-end user voice may be detected based on the conditions of both of Equations (17) and (18) being satisfied. As another example, near-end user voice may be detected based on the conditions of both of Equations (17) and (19) being satisfied. As yet another example, detection of near-end user voice may be premised upon the presence of all of the conditions expressed by Equations (17), (18), and (19).

Although the calculations above are performed with respect to time domain signals, the various calculations may also be performed in the frequency domain.

Figure 8:
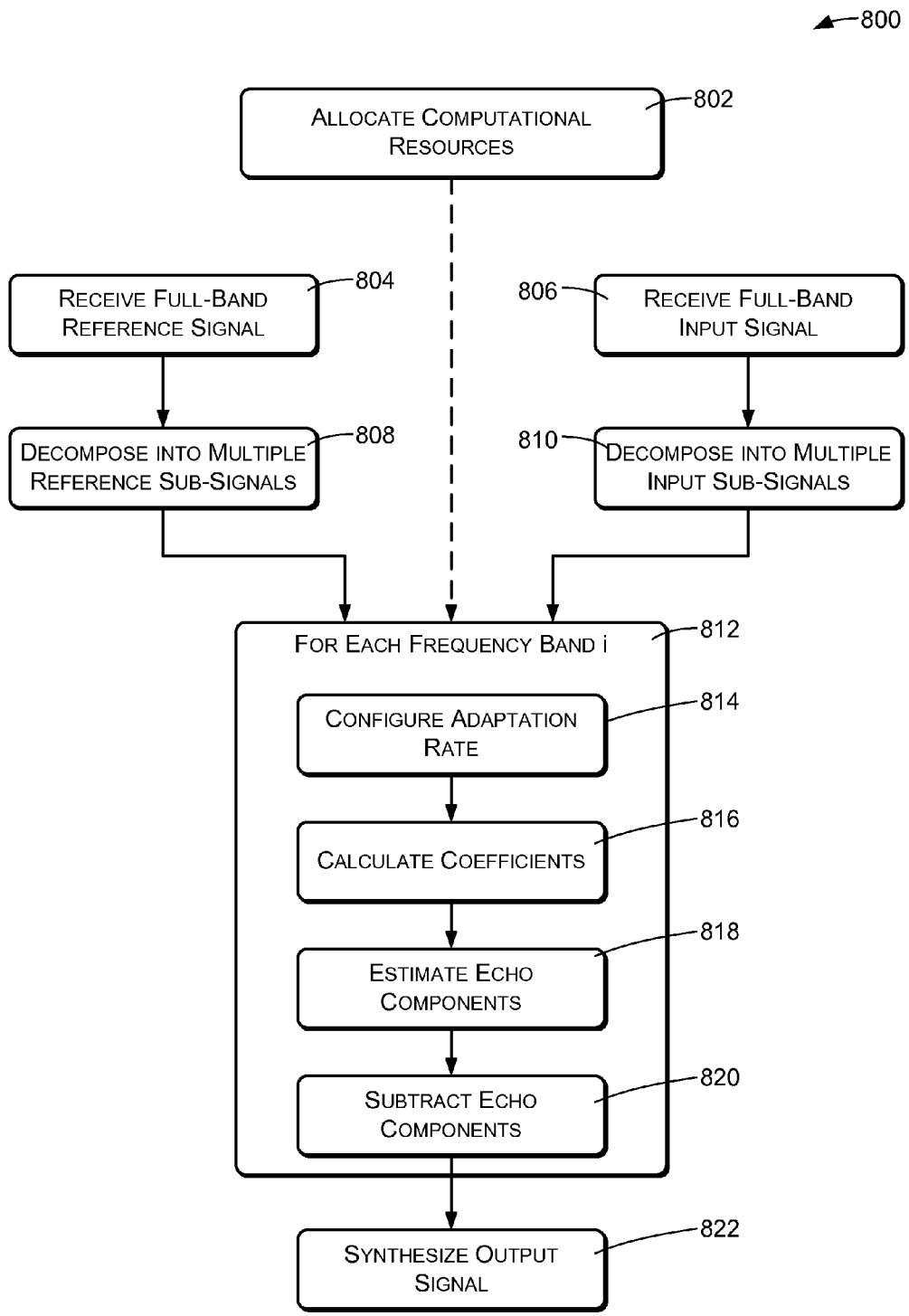
FIG. 8 is a flowchart illustrating an example of performing non-uniform adaptive echo suppression.

FIG. 8 illustrates a method 800 of acoustic echo cancellation in accordance with various embodiments. The method 800 will be described with reference to the components and signals of the preceding figures, although the method may also be performed in other environments and may be implemented in ways other than specifically described above.

An action 802 comprises allocating computational resources for performing echo suppression with respect to an input audio signal such as the input signal d(n). In certain embodiments, greater or fewer computational resources may be allocated for processing different frequency bands. For example, lower frequency bands may have relatively higher energies and/or may contain more significant components of user speech, and greater resources may be allocated to these lower frequency bands. Higher frequency bands may have relatively lower energies and/or may contain fewer significant components of user speech, and fewer resources may therefore be allocated to these higher frequency bands. In certain embodiments, relatively greater resources may be allocated to frequency bands corresponding to frequencies ranging from 1 kHz to 3 kHz.

Allocated resources may relate to any aspects of the acoustic echo cancellation described above. As an example, additional resources may be allocated by configuring the adaptive filters corresponding to certain frequency bands to have higher orders, with filters corresponding to low frequencies being configured to have higher orders than filters corresponding to higher frequencies. As another example, additional resources might be in the form of resources for varying adaptation rates for certain of the frequency bands and not others. Additional resources may also be represented by increased update rates for some frequency bands, such as filter adaptation rates that are higher in some frequency bands than others. Additionally, the described DTD and EPCD detection resources, used for further controlling the adaptation rates of adaptive filters, may be provided for some frequency bands and not others.

The allocating 802 may be performed independently for each of the frequency bands 1 through K, based on observed characteristics of one or more of the input sub-signals, the reference sub-signals, the echo-suppressed sub-signals, and/or other available signals in a particular AEC implementation. The observed characteristics may include powers or energies of the input, reference, and echo-suppressed sub-signals corresponding to respective frequency bands, and allocating resources to those frequency bands based on the determined or calculated powers or energies. As a more specific example, the adaptive filters may be configured with different filter orders based at least in part on the determined powers of the various signals.

The allocating 802 may be performed dynamically and repeatedly, during continuing operation of the system 100, based on parameters and signal characteristics that are received and/or observed during such continuing operation. For example, filter orders, adaptation rates, and other factors implicating greater or fewer computational resources may be reconfigured at periodic intervals and/or in response to changing conditions in the environment of the system 100 such as movement of people or objects and changing placements of the microphone 102 and/or speaker 104.

An action 804 comprises receiving a full-band reference signal, which may comprise a speaker signal such as the reference signal x(n). The full-band reference signal x(n) may be a signal from which an audio loudspeaker is driven. An action 806 comprises receiving a full-band input signal, which may comprise a microphone signal such as the signal d(n). The full-band input signal d(n) may contain user speech and other environmental sounds, and may also contain echoed components of the full-band reference signal x(n) that are picked up by the microphone 102 from the speaker 104. The term "full-band" is used to indicate that the signals contain components corresponding to multiple frequencies and/or frequency bands.

An action 808 comprises decomposing the reference audio signal x(n) into a plurality of reference sub-signals x(1,n) through x(K,n) corresponding respectively to different frequency bands 1 through K, wherein each reference sub-signal x(i,n) represents audio components of the corresponding frequency band i. An action 810 comprises decomposing the input audio signal d(n) into a plurality of input sub-signals d(1,n) through d(K,n) corresponding respectively to different bands 1 through K, wherein each input sub-signal d(i,n) represents audio components of the corresponding frequency band i.

A set of subsequent actions 812 relate to suppressing echo components of the input signal d(n), and more particularly to suppressing echo components of the individual input sub-signals d(i,n) corresponding to different frequency bands. The actions 812 are performed independently for each frequency band i.

An action 814 comprises calculating and/or configuring an adaptation rate μ, which may vary over time. The adaptation rate μ may be calculated periodically or in response to each input sample value, based at least in part on evaluated powers of the reference sub-signal x(i,n) and the echo-suppressed input sub-signal e(i,n) corresponding to a frequency band i. In certain implementations, the adaptation rate may be calculated in accordance with Equation (6), above, based on estimated powers of the reference sub-signal x(i,n), the echo-suppressed input sub-signal e(i,n), and any near-end audio v(i,n) that may be present in the input audio sub-signal (d,n).

The adaptation rate may also be modified or limited in certain frequency bands as a function of double talk detection and/or echo path change detection as described above with reference to FIG. 5. Accordingly, the action 814 may include detecting changes in echo paths associated with the different frequency bands and/or detecting whether near-end audio is represented by one or more of the reference sub-signals x(i, n), and changing or controlling the adaptation rate μ accordingly.

An action 816 comprises calculating coefficients for the adaptive filters 208. The coefficients may be calculated using a least means squared (LMS) or normalized least means squared (NLMS) algorithms, using the current value of the variable adaptation rate μ as described above.

An action 818 comprises estimating echo components of the input sub-signal d(i,n) to produce the estimated echo sub-signals y(i,n). In certain embodiments, the action 818 may comprise applying an adaptive filter having an order as configured in the action 802 and using coefficients as calculated in the action 816. The adaptive filter may comprise a finite impulse response (FIR) filter in certain embodiments.

An action 820 comprises subtracting the estimated echo sub-signals y(i,n) from the corresponding input sub-signals d(i,n) to produce the echo-suppressed sub-signals e(i,n).

An action 822 comprises synthesizing the echo-suppressed output signal e(n) from the multiple echo-suppressed sub-signals e(i,n), which are of lower sampling rates. This may comprise up-sampling, filtering by a synthesis filter bank, and summing the values of the individual echo-suppressed output sub-signals.

The functionality described above may be implemented by various types of logic, including digital processors, signal processors, or similar types of devices that perform operations based on instructions and/or programs stored in associated memory. In other embodiments, the described functionality may be performed by other means, which may include non-programmable elements such as analog components, discrete logic elements, and so forth.

Figure 9:
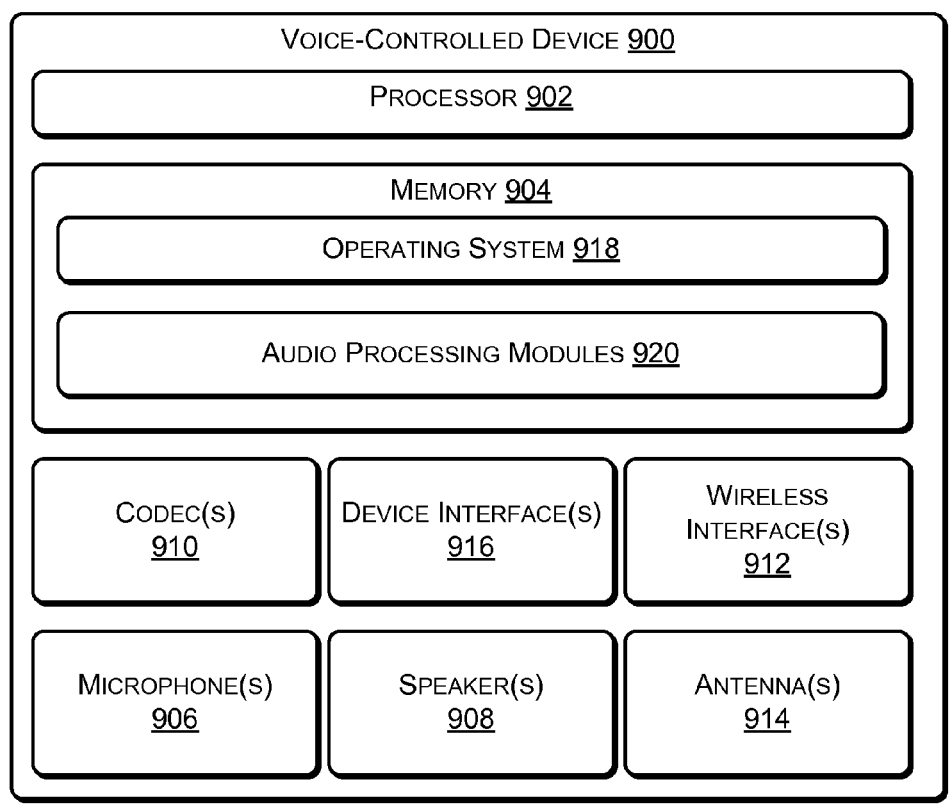
FIG. 9 is a block diagram illustrating an example system or device in which the techniques described herein may be implemented.

FIG. 9 shows an example of an audio system, element, or component that may be configured to perform adaptive echo cancellation in accordance with the techniques described above. In this example, the audio system comprises a voice-controlled device 900 that may function as an interface to an automated system. However, the devices and techniques described above may be implemented in a variety of different architectures and contexts. For example, the described echo cancellation may be used in various types of devices that perform audio processing, including mobile phones, entertainment systems, communications components, and so forth.

The voice-controlled device 900 may in some embodiments comprise a module that is positioned within a room, such as on a table within the room, which is configured to receive voice input from a user and to initiate appropriate actions in response to the voice input. In the illustrated implementation, the voice-controlled device 900 includes a processor 902 and memory 904. The memory 904 may include computer-readable storage media ("CRSM"), which may be any available physical media accessible by the processor 902 to execute instructions stored on the memory 904. In one basic implementation, CRSM may include random access memory ("RAM") and flash memory. In other implementations, CRSM may include, but is not limited to, read-only memory ("ROM"), electrically erasable programmable read-only memory ("EEPROM"), or any other medium which can be used to store the desired information and which can be accessed by the processor 902.

The voice-controlled device 900 includes a microphone unit that comprises one or more microphones 906 to receive audio input, such as user voice input. The device 900 also includes a speaker unit that includes one or more speakers 908 to output audio sounds. One or more codecs 910 are coupled to the microphone(s) 906 and the speaker(s) 908 to encode and/or decode audio signals. The codec(s) 910 may convert audio data between analog and digital formats. A user may interact with the device 900 by speaking to it, and the microphone(s) 906 captures sound and generates an audio signal that includes the user speech. The codec(s) 910 encodes the user speech and transfers that audio data to other components. The device 900 can communicate back to the user by emitting audible sounds or speech through the speaker(s) 908. In this manner, the user may interacts with the voice-controlled device 900 simply through speech, without use of a keyboard or display common to other types of devices.

In the illustrated example, the voice-controlled device 900 includes one or more wireless interfaces 912 coupled to one or more antennas 914 to facilitate a wireless connection to a network. The wireless interface(s) 912 may implement one or more of various wireless technologies, such as wifi, Bluetooth, RF, and so forth.

One or more device interfaces 916 (e.g., USB, broadband connection, etc.) may further be provided as part of the device 900 to facilitate a wired connection to a network, or a plug-in network device that communicates with other wireless networks.

The voice-controlled device 900 may be designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 900 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 900 does not use or need to use any input devices or displays in some instances.

Several modules such as instruction, datastores, and so forth may be stored within the memory 904 and configured to execute on the processor 902. An operating system module 918, for example, may be configured to manage hardware and services (e.g., wireless unit, Codec, etc.) within and coupled to the device 900 for the benefit of other modules. In addition, the memory 904 may include one or more audio processing modules 920, which may be executed by the processor 902 to perform the methods described herein, as well as other audio processing functions.

Although the example of FIG. 9 shows a programmatic implementation, the functionality described above may be performed by other means, including non-programmable elements such as analog components, discrete logic elements, and so forth. Thus, in some embodiments various ones of the components, functions, and elements described herein may be implemented using programmable elements such as digital signal processors, analog processors, and so forth. In other embodiments, one or more of the components, functions, or elements may be implemented using specialized or dedicated circuits. The term "component", as used herein, is intended to include any hardware, software, logic, or combinations of the foregoing that are used to implement the functionality attributed to the component.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   one or more input filters configured to decompose a microphone signal into a plurality of input sub-signals corresponding respectively to different frequency bands;
   one or more reference filters configured to decompose a reference audio signal into a plurality of reference sub-signals corresponding respectively to the different frequency bands;
   a plurality of echo cancellers corresponding respectively to the different frequency bands, wherein the echo canceller corresponding to each frequency band is configured to suppress echoes in an input sub-signal corresponding to a frequency band based at least in part on a reference sub-signal corresponding to the frequency band to produce an echo-suppressed input sub-signal corresponding to the frequency band;
   a signal synthesizer configured to synthesize an echo-suppressed output audio signal by summing the produced echo-suppressed input sub-signals; and
   wherein a first adaptive finite impulse response filter of a first of the echo cancellers has a first filter order and a second adaptive finite impulse response filter of a second of the echo cancellers has a second filter order that is different than the first filter order; and
   wherein the first filter order and the second filter order are based at least in part on a power of the reference sub-signal corresponding to the first of the echo cancellers in relation to an average of the powers of the reference sub-signals of the different frequency bands.

2. The system of claim 1, wherein the first adaptive finite impulse response filter corresponds to a first of the frequency bands and has a tap length that is calculated as a minimum of N and a rounded integer of $$(L_e/R)*P_x/Px_{average}, \text{ where:}$$

$L_e$ is an echo path length associated with the first frequency band;
R is a subsampling rate;
N is a rounded integer of $L_e/R$;
$P_x$ is a power of the reference sub-signal corresponding to the first frequency band; and
$Px_{average}$ is an average of the powers of the reference sub-signals corresponding to all of the frequency bands.

3. The system of claim 1, wherein:
   the first adaptive finite impulse response filter corresponds to a first of the frequency bands;
   the first filter order is increased in response to increasing length of an echo path associated with the first frequency band; and
   the first filter order is decreased in response to decreasing length of the echo path associated with the first frequency band.

4. The system of claim 1, wherein the first adaptive finite impulse response filter corresponds to a first of the frequency bands, further comprising:
   an echo path change detector configured to detect a change in an echo path associated with the first of the frequency bands;
   a double-talk detector configured to detect whether near-end audio is represented by the input sub-signal corresponding to the first of the frequency bands; and
   wherein the first adaptive finite impulse response filter has an adaptation rate that increases in response to detection of a change in the echo path by the echo path change detector and decreases in response to detection of near-end audio by the double-talk detector.

5. A method, comprising:
   decomposing an input audio signal into a plurality of input sub-signals corresponding respectively to different frequency bands;
   decomposing a reference audio signal into a plurality of reference sub-signals corresponding respectively to the different frequency bands;
   suppressing echo components of each input sub-signal based at least in part on the reference sub-signal corresponding to a same frequency band as the input sub-signal to produce echo-suppressed input sub-signals corresponding respectively to the different frequency bands;
   dynamically allocating computational resources for the suppressing based at least in part on a power of at least the reference sub-signal, wherein greater computational resources are allocated for suppressing the echo components of a first of the input sub-signals than are allocated for suppressing the echo components of a second of the input sub-signals; and
   synthesizing an echo-suppressed output audio signal from the echo-suppressed input sub-signals.

6. The method of claim 5, wherein synthesizing the echo-suppressed output audio signal comprises summing the echo-suppressed input sub-signals.

7. The method of claim 5, further comprising repeatedly performing the allocating based at least in part on one or more characteristics of one or more of the following:
   the input sub-signals;
   the reference sub-signals; or
   the echo-suppressed sub-signals.

8. The method of claim 5, further comprising:
   determining power of each of the reference sub-signals;
   determining power of each of the echo-suppressed sub-signals; and
   wherein the allocating is performed independently for each of the input sub-signals based at least in part on the determined powers of the reference sub-signal and the echo-suppressed sub-signal corresponding to a same frequency band as the input sub-signal.

9. The method of claim 5, wherein the allocating comprises configuring filter orders of multiple adaptive filters that are used in the suppressing, further comprising:

determining powers of the reference sub-signals;
determining echo path lengths associated with the frequency bands; and
varying the filter orders of the multiple adaptive filters independently based at least in part on the determined powers and the determined echo path lengths.

10. The method of claim 5 wherein:
the allocating comprises configuring filter orders of multiple adaptive filters that are used in the suppressing;
the filter order of a first of the adaptive filters corresponding to a first of the frequency bands is higher than the filter order of a second of the adaptive filters corresponding to a second of the frequency bands; and
the first frequency band is lower than the second frequency band.

11. The method of claim 5, further comprising:
determining powers of the reference sub-signals;
determining powers of the echo-suppressed input sub-signals; and
wherein the suppressing comprises adaptively filtering the input sub-signals at respective adaptation rates that vary independently based at least in part on the determined powers of the reference sub-signals and the echo-suppressed input sub-signals.

12. The method of claim 5, further comprising
detecting whether there are changes in echo paths associated with the different frequency bands;
detecting whether near-end audio is represented by one or more of the input sub-signals; and
wherein the suppressing comprises adaptively filtering the input sub-signal corresponding to a particular frequency band at an adaptation rate that varies by an amount that is based at least in part on (a) whether a change is detected in an echo path associated with the particular frequency band or (b) whether near-end audio is represented by the input sub-signal corresponding to the particular frequency band.

13. A method, comprising:
decomposing an input audio signal into a plurality of input sub-signals corresponding respectively to different frequency bands, wherein a first input sub-signal, from the plurality of input sub-signals, represents audio data of a first frequency band;
decomposing a reference audio signal into a plurality of reference sub-signals corresponding respectively to the different frequency bands, wherein a first reference sub-signal, from the plurality of reference sub-signals, represents audio data of the first frequency band;
suppressing echo components of the first input sub-signal based at least in part on the first reference sub-signal to produce a first echo-suppressed input sub-signal corresponding to the first frequency band;
calculating a variable adaptation rate based at least in part on power of the first reference sub-signal and power of the first echo-suppressed input sub-signal, wherein the suppressing comprises adaptively filtering the first input sub-signal using the variable adaptation rate; and
synthesizing a first echo-suppressed output audio signal from the first echo-suppressed input sub-signal.

14. The method of claim 13, further comprising increasing the variable adaptation rate in response to a change in an echo path length associated with the first frequency band.

15. The method of claim 13, further comprising decreasing the variable adaptation rate in response to detected near-end audio being in first input sub-signal.

16. The method of claim 13, further comprising allocating computational resources for the suppressing, wherein greater computational resources are assigned for suppressing the echo components of the first input sub-signal of the input sub-signals than are assigned for suppressing the echo components of a second input sub-signal of the input sub-signals.

17. The method of claim 13, further comprising allocating computational resources for the suppressing, wherein greater computational resources are assigned for suppressing the echo components of the first input sub-signal of the input sub-signals than are assigned for suppressing the echo components of a second input sub-signal of the input sub-signals, wherein the allocating comprises configuring filter orders of one or more adaptive filters that are used in the suppressing.

18. The system of claim 1, wherein the first of the echo cancellers corresponds to a lower frequency band than the second of the echo cancellers and the first filter order is higher than the second filter order.

19. The method of claim 13, further comprising dynamically allocating computational resources for the suppressing based at least in part on a power of the first reference sub-signal, wherein greater computational resources are assigned for suppressing the echo components of the first input sub-signal of the input sub-signals than are assigned for suppressing the echo components of a second input sub-signal of the input sub-signals.

20. A system, comprising:
one or more input filters configured to decompose a microphone signal into a plurality of input sub-signals corresponding respectively to different frequency bands;
one or more reference filters configured to decompose a reference audio signal into a plurality of reference sub-signals corresponding respectively to the different frequency bands;
a plurality of echo cancellers corresponding respectively to the different frequency bands, wherein the echo canceller corresponding to each frequency band is configured to suppress echoes in an input sub-signal corresponding to a frequency band based at least in part on a reference sub-signal corresponding to the frequency band to produce an echo-suppressed input sub-signal corresponding to the frequency band;
a signal synthesizer configured to synthesize an echo-suppressed output audio signal by summing the produced echo-suppressed input sub-signals; and
wherein a first adaptive finite impulse response filter of a first of the echo cancellers has a first filter order and a second adaptive finite impulse response filter of a second of the echo cancellers has a second filter order that is different than the first filter order; and
wherein the first filter order and the second filter order are based at least in part on a power estimation of the echo-suppressed sub-signal in relation to a power estimation of near-end audio in the input sub-signal.

21. The system of claim 20, wherein the first adaptive finite impulse response filter corresponds to a first of the frequency bands and has an adaptation rate that is calculated as $\max\{1-\alpha P_v/P_e, \xi\}$, where
$\alpha$ is a first positive scalar;
$\xi$ is a second positive scalar;
$P_e$ is a power estimation of the echo-suppressed sub-signal corresponding to the first frequency band; and
$P_v$ is a power estimation of near-end audio in the input sub-signal corresponding to the first frequency band.

* * * * *